(12) United States Patent
Koch et al.

(10) Patent No.: US 6,193,623 B1
(45) Date of Patent: Feb. 27, 2001

(54) TENSIONER WITH IMPROVED DAMPING DEVICE

(75) Inventors: Reinhard Koch, Emskirchen; Bolko Schuseil, Adelsdorf; Thomas Ullein, Stegaurach, all of (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/243,285

(22) Filed: Feb. 2, 1999

Related U.S. Application Data

(63) Continuation of application No. PCT/EP97/03220, filed on Jun. 20, 1997.
(60) Provisional application No. 60/023,214, filed on Aug. 2, 1996.

(51) Int. Cl.[7] .................................................. F16H 7/08
(52) U.S. Cl. ............................................ 474/110; 474/138
(58) Field of Search .................................... 474/101, 110, 474/111, 112, 117, 133, 135, 136, 138; 137/5, 43.17

(56) References Cited

U.S. PATENT DOCUMENTS

| | | | |
|---|---|---|---|
| 4,997,411 | * | 3/1991 | Breon et al. ................. 474/138 X |
| 5,366,415 | * | 11/1994 | Church et al. ................. 474/110 |
| 5,628,701 | * | 5/1997 | Dembosky et al. ............ 474/110 X |
| 5,637,047 | * | 6/1997 | Schulze ......................... 474/110 |

FOREIGN PATENT DOCUMENTS

| | | |
|---|---|---|
| 37 41 860 | 6/1989 | (DE) . |
| 40 15 708 | 7/1991 | (DE) . |
| 40 35 823 | 12/1991 | (DE) . |
| 43 40 487 | 6/1994 | (DE) . |
| 43 11 056 | 7/1994 | (DE) . |
| 196 32 383 | 2/1997 | (DE) . |
| 0 483 564 | 5/1992 | (EP) . |
| 0 779 451 | 6/1997 | (EP) . |
| 952375 | * 10/1999 | (EP) . |
| 306857 | * 11/1998 | (JP) . |

* cited by examiner

Primary Examiner—David A. Bucci
Assistant Examiner—Marcus Charles
(74) Attorney, Agent, or Firm—Henry M. Feiereisen

(57) ABSTRACT

A tensioner for a driving member includes a piston (4) guided slidably in a housing (1) and spring-loaded against the driving member. The tensioner further includes a damping device (9, 18) for damping movements of the piston through discharge of hydraulic fluid, such as engine oil, from a pressure chamber (16) via at least one leak gap (13, 26) of the damping device (9, 18). A simple and economic implementation of the leak gap is assured by arranging a rotationally symmetrical body such as a cylinder (10) in a receptacle (11, 24) of the damping device (9, 18), so that the leak gap (13, 26) is formed between the wall (12, 25) of the receptacle and the peripheral surface of the rotationally symmetrical body (10).

13 Claims, 1 Drawing Sheet

TENSIONER WITH IMPROVED DAMPING DEVICE

CROSS-REFERENCES TO RELATED APPLICATIONS

This application is a continuation of prior filed PCT International application No. PCT/EP97/03220, filed Jun. 20, 1997, and claims the priorities of German Patent Application, Serial No. 196 31 607.3, filed Aug. 5, 1996, and U.S. Provisional Patent Application, Serial No. 60/023,214, filed Aug. 2, 1996, the subject matters of which are incorporated herein by reference.

BACKGROUND OF THE INVENTION

The present invention relates, in general, to a tensioner, and more particularly to a tensioner applied for a chain-type driving member, and being of a type having a piston guided slidably in a bore of a housing and spring-loaded against the driving member, and a damping device for damping movements of the piston by a discharge of hydraulic fluid such as engine oil from a pressure chamber via at least one leak gap of the damping device.

A chain tensioner of this type is disclosed, for example, in German Pat. No. 40 15 708 and includes an annular disk arranged in the cavity of a hollow cylindrical piston which is closed at one end by a bottom. The annular disk has one flat end face which bears against the piston bottom whose inner wall includes radially extending throttling channels which open radially outwards into an annular throttling channel. The annular disk is provided with a through-bore which communicates with these throttling channels. The pressure chamber extends into the interior of the hollow piston. The engine oil which is pressurized by inward movements of the piston flows through the through-bore of the annular disk into the throttling channels and ultimately via an opening in the piston bottom to the outside of the piston i.e., out of the tensioner.

In tensioners of this type, the damping device should be matched very closely to the operational conditions of the tensioner, whereby particular importance is being given to the configuration of the leak gap and the throttling channels because the cross section of flow provided in the throttling channels has a major influence on the damping of the piston. In the case of the referred-to conventional tensioner, the throttling channels are arranged in a crossing pattern which complicates the production. If the throttling channels are made in an extrusion process, excessive variations from specified dimensions can occur in certain cases. A higher precision in shape and size can certainly be obtained by making the throttling channels through a machining process but this involves more work and higher costs. If the piston is of single-piece structure i.e., if the piston skirt and bottom are made as an integral component, it is very difficult, and in the case of very long piston skirts, even impossible to make the leak and throttling channels on the inner wall of the piston bottom.

SUMMARY OF THE INVENTION

It is thus an object of the present invention to provide an improved tensioner, obviating the afore-stated drawbacks.

In particular, it is an object of the present invention to provide an improved tensioner which allows, in particular, a simple manufacture of the damping device while yet enabling a perfect adaptation of the leak and throttling gaps to requirements.

These objects, and others which will become apparent hereinafter, are attained in accordance with the present invention by disposing a rotationally symmetrical body, such as a cylinder, in a receptacle of the damping device such that the leak gap is formed between a wall of the receptacle and a peripheral surface of the rotationally symmetrical body.

The tensioner according to the invention permits the leak gap to be made in a very simple and economic manner with a high degree of precision. A particularly simple solution is realized by configuring the wall of the receptacle with a circular cylindrical contour. Certain deviations of the wall of the receptacle from its circular cylindrical contour are possible but such a configuration is apparently very easy to implement into practice. The leak gap is formed by simply inserting the cylinder in coaxial relationship with the circular cylindrical wall of the receptacle into the receptacle. The peripheral surface and the outer diameter of the cylinder can be fabricated to a high degree of precision. It is also possible, for instance, to use low price cylindrical rolling elements of rolling bearings whose outer diameters, by reason of their intended use, are often very precisely implemented. However, the cylinder may also be replaced by a ball to attain all the advantages of the invention. In the case of the ball, the leak gap would be formed between the equator of the ball and the wall of the receptacle.

As in the afore-described conventional tensioner, the damping device of the tensioner according to the invention is suitably arranged in the hollow piston at the upper end thereof which forms the piston bottom, and the cylinder is disposed, in accordance with the invention, concentric to the piston. In this way, any gas collected in the pressure chamber can be evacuated through the leak gap when the piston bottom is in an overhead position.

The wall of the receptacle is preferably constituted by the inner wall of the hollow piston. However, it is also possible to arrange a bushing inside the hollow piston so that the inner wall of the bushing then forms the wall of the receptacle. This solution is particularly advantageous in the case of hollow pistons with very long skirt portions. A machining of the inner wall of such pistons in the vicinity of the piston bottom is technically very complicated or even impossible because the machining tool has to be inserted very far into the hollow piston. The separate bushing proposed here offers the advantage that the inner wall which is determinative for the leak gap can be made in advance on the bushing. To prevent hydraulic fluid from leaking out between the bushing and the piston, a seal can be arranged so as to seal in the direction of the piston bottom a potential gap forming between the bushing and the piston. The seal is advantageously arranged between the piston bottom and the bushing and comprises a passage for hydraulic fluid discharged from the leak gap.

In similar manner as the conventional tensioner, the damping device and the piston bottom of the tensioner according to the present invention include intercommunicating passages through which hydraulic fluid emanating from the leak gap can be discharged.

To limit an excessively high pressure in the pressure chamber, a pressure relief valve, preferably in the form of a non-return valve, can be provided. The integration of a non-return valve in the tensioner according to the invention is particularly simple if the rotationally symmetrical body is configured as a hollow cylinder. In this case, the hollow cylinder surrounds the non-return valve, and a pressure chamber confronting end face of the hollow cylinder forms a valve seat for the valve ball which is spring-biased in the direction of the valve seat. On build-up of an excessively high pressure in the pressure chamber, the valve ball lifts off the valve seat and pressure medium flows out of the tensioner to the outside, with the above-described through-passages preferably realizing a communication between the non-return valve and the exterior of the tensioner.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
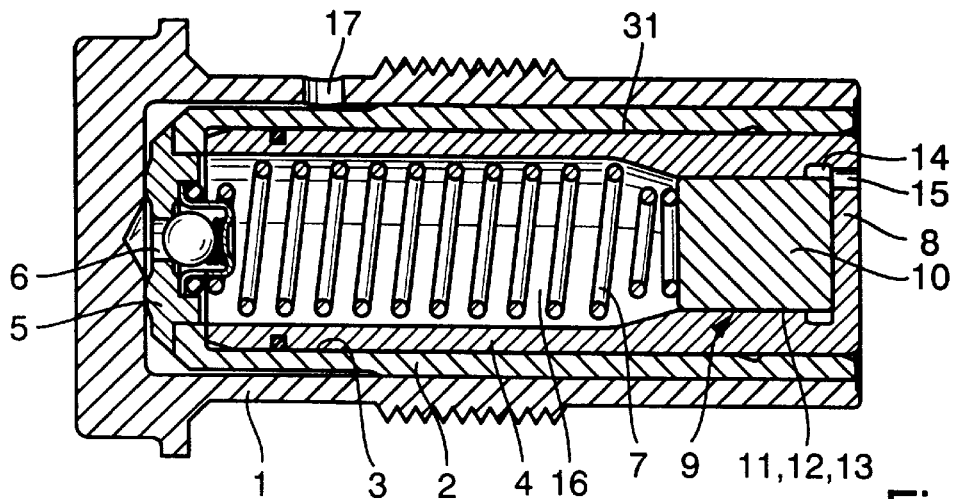
FIG. 1 is a longitudinal section of a first embodiment of a tensioner according to the invention.

Throughout all the Figures, same or corresponding elements are generally indicated by same reference numerals.

Turning now to the drawing, and in particular to FIG. 1, there is shown a longitudinal section of a first embodiment of a tensioner according to the invention, including a housing 1 which surrounds a tube 2. The tube 2 is formed with a bore 3 for slidably guiding a piston 4 and has a bottom 5 for accommodating a non-return valve 6. A helical compression spring 7 has one end bearing against the bottom 5 and another end acting on the piston 4 to urge the piston 4 out of the housing 1 so that the piston bottom 8 is pressed against a chain (not shown). Arranged inside the piston 4 in immediate proximity to the piston bottom 8 is a damping device, generally designated by reference numeral 9 and including a roller 10 which is positioned coaxially with the piston 4. In the region of the roller 10, the interior of the piston 4 is configured as a receptacle 1 1 for the roller 10, with the wall 12 of the receptacle 11 and the confronting peripheral surface of the roller 10 defining a leak gap 13. The helical compression spring 7 bears against one end face of the roller 10 while the other end face of the roller 10 is supported by the piston bottom 8. Axially adjacent to the piston bottom 8, there is arranged on the inner wall of the piston 4, an annular groove 14 which communicates with a through-passage 15 provided in the piston bottom 8.

The tube 2 and the piston 4 define a pressure chamber 16 for hydraulic fluid, particularly engine oil. The hydraulic fluid is introduced into the pressure chamber 16 through a housing orifice 17 and via the non-return valve 6.

Outward movements of the piston 4 result in an enlargement of the pressure chamber 16 accompanied by a drop in pressure. As a consequence of the pressure drop, the non-return valve 16 opens so that hydraulic fluid flows into the pressure chamber 16. An inward movement of the piston 4 diminishes the pressure chamber 16 whereby the pressure increases so that hydraulic fluid escapes from the tensioner by flowing through the leak gap 13 into the annular groove 14 and from there via the through-passage 15 to the outside. Thus, the inward movements of the piston 4 are dampened, with the leak gap 13 playing a decisive role in the damping action.

Figure 2:
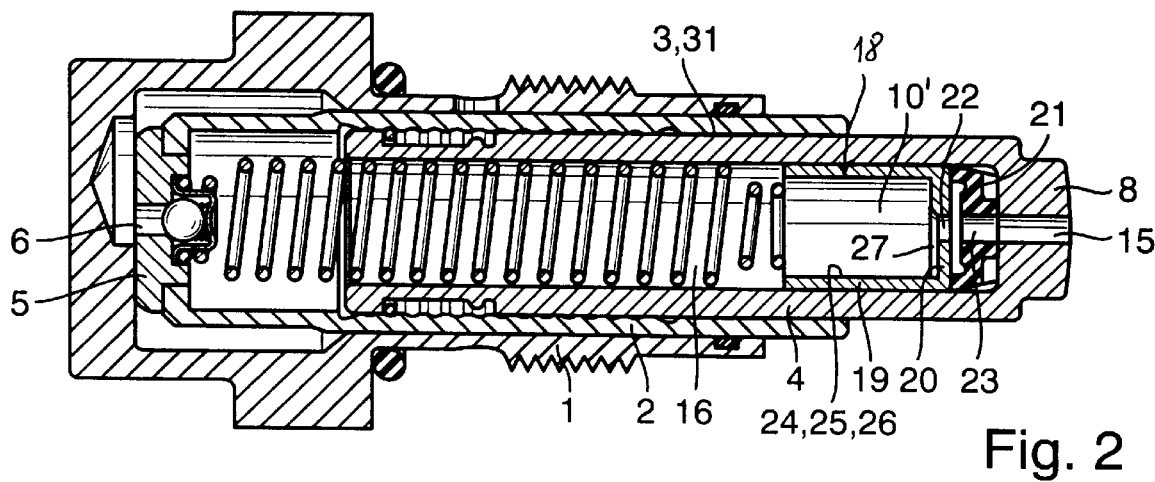
FIG. 2 is a longitudinal section of a second embodiment of a tensioner according to the invention.

Turning now to FIG. 2, there is shown a longitudinal section of a second embodiment of a tensioner according to the present invention which differs from the previously described tensioner mainly by the provision of a modified damping device 18. This damping device 18 includes a roller in the form of a hollow cylinder 10' and a cup-shaped bushing 19 having a bottom 20. Arranged between the bottom 20 of the bushing 19 and the piston bottom 8 is a seal 21. The bottom 20 of the bushing 19 is formed with a through-passage 22 which is in alignment with a through-passage 23 of the seal 21 and the through-passage 15 of the piston bottom 8, thereby forming a passageway which extends coaxially with the piston 4. The interior of the bushing 19 is configured as a receptacle 24 for the cylinder 10', with the wall 25 of the receptacle 24 and the confronting peripheral surface of the cylinder 10 defining a leak gap 26 in accordance with the invention. The cylinder 10 bears against the bushing bottom 20 whereby a cylinder-proximal end face of the bushing bottom 20 is formed with a depression 27 which communicates with the through-passage 22. On an inward movement of the piston 4, hydraulic fluid flows through the leak gap 26 into the depression 27 and from there via the through-passages 22, 23, 15 to the outside of the tensioner. The damping device 18 is used preferably in the case the piston 4 has a great length. Since the piston 4 is formed integrally with the piston bottom 8, a machining of the inner wall of the piston 4 for making the receptacle wall according to the previously described embodiment of the invention would involve introducing a tool from the open end of the piston 4. This procedure would be very complicated and cost-intensive. The use of the bushing 19 according to the invention permits a simple machining of the wall 25 of the receptacle 24 irrespective of the length of the piston 4.

Figure 3:
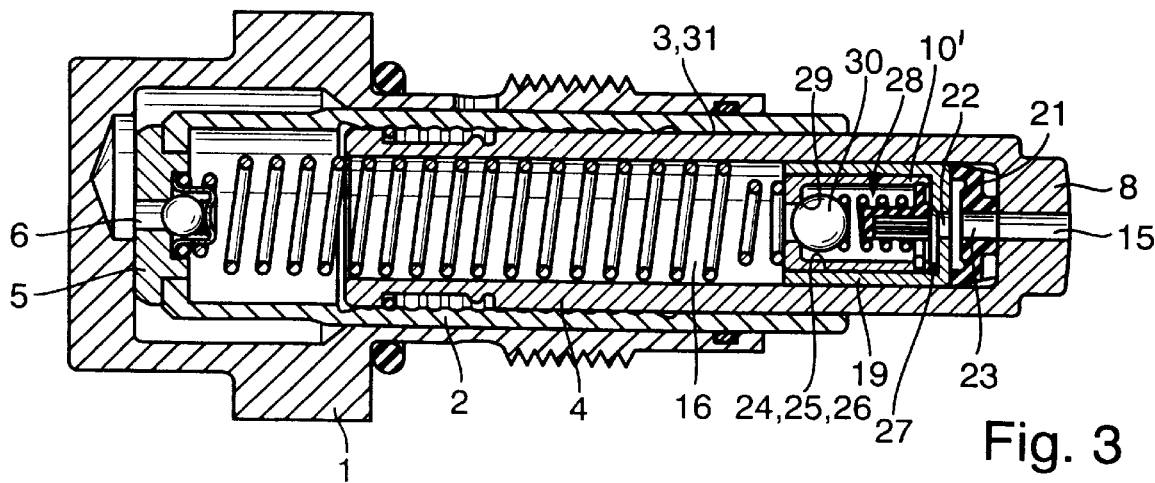
FIG. 3 is a longitudinal section of a third embodiment of a tensioner according to the invention.

FIG. 3 shows a longitudinal section of a third embodiment of a tensioner according to the invention which differs from the tensioner of FIG. 2 mainly by the provision of a non-return valve 28 which opens when pressure in the pressure chamber 16 becomes excessive. The non-return valve 28 is arranged inside the hollow cylinder 10'. On its end face confronting the pressure chamber 16, the hollow cylinder 10' forms a valve seat 29 for a valve ball 30. When the pressure in the pressure chamber 16 becomes excessive, the valve ball 30 lifts off the valve seat 29 and hydraulic fluid which exits through the non-return valve 28 exits the tensioner via the through-passages 22, 23, 15.

In all the embodiments of the invention described herein, a further leak gap 31 is formed between the piston 4 and the tube 2, but this leak gap 31 is configured to be so narrow that its damping effect is negligible.

While the invention has been illustrated and described as embodied in a tensioner with improved damping device, it is not intended to be limited to the details shown since various modifications and structural changes may be made without departing in any way from the spirit of the present invention.

What is claimed as new and desired to be protected by Letters Patent is set forth in the appended claims:

1. A tensioner for a driving member, comprising:
   a housing;
   a piston slidably guided in the housing and spring-loaded in the direction of the driving member, said piston defining a pressure chamber; and
   a damping device for damping movements of the piston through discharge of hydraulic fluid from the pressure chamber via at least one ring shape or circola leak gap, said damping device including a receptacle and a rotationally symmetrical body arranged in the receptacle such that the leak gap is formed between an inner wall surface of the receptacle and an outer peripheral surface of the rotationally symmetrical body.

2. The tensioner of claim 1 wherein the hydraulic fluid is engine oil.

3. The tensioner of claim 1 wherein the rotationally symmetrical body is a cylinder.

4. The tensioner of claim 1 wherein the piston is hollow and has one end forming a piston bottom, said damping device being arranged in the piston adjacent the piston bottom, said rotationally symmetrical body being disposed concentrically to the piston.

5. The tensioner of claim 1, and further comprising a pressure relief valve for limiting a pressure in the pressure chamber.

6. The tensioner of claim 4 wherein the hollow piston has an inner wall for forming the wall of the receptacle.

7. The tensioner of claim 4 wherein the damping device includes a bushing arranged inside the hollow piston and having an inner wall forming the wall of the receptacle.

8. The tensioner of claim 4 wherein the damping device and the piston bottom include passages communicating with one another for discharge of hydraulic fluid escaping through the leak gap.

9. The tensioner of claim 7 wherein the damping device includes a seal to close a gap, formed between the bushing and the piston, in direction of the piston bottom.

10. The tensioner of claim 9 wherein the seal has a passage which communicates with the leak gap for receiving hydraulic fluid discharged from the leak gap.

11. The tensioner of claim 5 wherein the pressure relief valve is a non-return valve.

12. The tensioner of claim 5 wherein the rotationally symmetrical body is a hollow cylinder which surrounds the pressure relief valve, said hollow cylinder having an end face confronting the pressure chamber and forming a valve seat for a valve ball of the pressure relief valve, said valve ball being spring-loaded against the valve seat and lifts off the valve seat when a pressure in the pressure chamber exceeds a permissible pressure.

13. The tensioner of claim 11 wherein the damping device and the piston bottom include passages communicating with one another for discharge of hydraulic fluid escaping through the leak gap, said non-return valve communicating with the passages.

* * * * *

UNITED STATES PATENT AND TRADEMARK OFFICE
CERTIFICATE OF CORRECTION

PATENT NO.    : 6,193,623 B1
DATED         : February 27, 2001
INVENTOR(S)   : Reinhard Koch et al.

Page 1 of 1

It is certified that error appears in the above-identified patent and that said Letters Patent is hereby corrected as shown below:

Title page,
Insert the following priority data:
-- (30) Foreign Application Priority Data
August 5, 1996  Germany ........... 196 31 607 --

Column 4,
Line 64, change "circola" to -- circular --.

Signed and Sealed this

Fourth Day of September, 2001

*Attest:*

*Attesting Officer*

NICHOLAS P. GODICI
*Acting Director of the United States Patent and Trademark Office*